United States Patent
Mamino et al.

(10) Patent No.: US 9,994,708 B2
(45) Date of Patent: Jun. 12, 2018

(54) METHOD FOR PRODUCING THERMOPLASTIC RESIN COMPOSITION, THERMOPLASTIC RESIN COMPOSITION AND COPIER/PRINTER EXTERIOR PART

(71) Applicants: Konica Minolta, Inc., Tokyo (JP); Shanghai Kumhosunny Plastics Co., Ltd., Minhang District, Shanghai (CN)

(72) Inventors: Masashi Mamino, Mitaka (JP); Keita Miyazaki, Kunitachi (JP); Ryuji Kitani, Hino (JP); Minqi Xin, Shanghai (CN); Minghua Luo, Shanghai (CN); Qiang Li, Shanghai (CN); Wenqiang Li, Shanghai (CN); Lei Gao, Shanghai (CN)

(73) Assignees: KONICA MINOLTA, INC., Tokyo (JP); SHANGHAI KUMHOSUNNY PLASTICS CO., LTD., Shanghai (CN)

( * ) Notice: Subject to any disclaimer, the term of this patent is extended or adjusted under 35 U.S.C. 154(b) by 129 days.

(21) Appl. No.: 15/064,100

(22) Filed: Mar. 8, 2016

(65) Prior Publication Data
US 2016/0280911 A1 Sep. 29, 2016

(30) Foreign Application Priority Data
Mar. 27, 2015 (CN) .......................... 2015 1 0142210

(51) Int. Cl.
C08L 69/00 (2006.01)
B29B 7/56 (2006.01)
(Continued)

(52) U.S. Cl.
CPC .............. *C08L 69/00* (2013.01); *B29B 7/566* (2013.01); *B29B 7/568* (2013.01); *B29B 7/7461* (2013.01); *B29B 7/7466* (2013.01); *B29B 7/7485* (2013.01); *B29B 7/7495* (2013.01); *C08J 3/005* (2013.01); *B29B 7/183* (2013.01); *C08J 2369/00* (2013.01); *C08J 2425/12* (2013.01);
(Continued)

(58) Field of Classification Search
CPC ....................................................... C08L 69/00
See application file for complete search history.

(56) References Cited

U.S. PATENT DOCUMENTS

2015/0141560 A1* 5/2015 Yu ........................... C08L 69/00
524/127

FOREIGN PATENT DOCUMENTS

JP          H11-293102 A       10/1999

* cited by examiner

*Primary Examiner* — Arrie L Reuther
(74) *Attorney, Agent, or Firm* — Lucas & Mercanti, LLP

(57) ABSTRACT

A method for producing a thermoplastic resin composition includes melt-blending 50 to 80 parts by mass of a crystalline polyester resin and 20 to 50 parts by mass of an amorphous polyester resin with an extruder, thereby producing a first polyester resin compound. The method further includes melt-blending 90 to 99 parts by mass of the crystalline polyester resin and 1 to 10 parts by mass of a styrene-acrylonitrile-glycidyl methacrylate terpolymer with the extruder or a different extruder, thereby producing a second polyester resin compound. The method further includes compounding 1 to 10 parts by mass of the first polyester resin compound, 1 to 10 parts by mass of the second polyester resin compound, and respective predetermined amounts of a polycarbonate resin, a flame retardant, an antidrip agent, an antioxidant, a lubricant and a toughening agent.

9 Claims, 2 Drawing Sheets

(51) Int. Cl.
*B29B 7/74* (2006.01)
*C08J 3/00* (2006.01)
*B29B 7/18* (2006.01)
(52) U.S. Cl.
CPC ..... *C08J 2467/02* (2013.01); *C08L 2205/035* (2013.01); *C08L 2310/00* (2013.01)

METHOD FOR PRODUCING THERMOPLASTIC RESIN COMPOSITION, THERMOPLASTIC RESIN COMPOSITION AND COPIER/PRINTER EXTERIOR PART

BACKGROUND OF THE INVENTION

1. Field of the Invention

The present invention relates to: a method for producing a thermoplastic resin composition; a thermoplastic resin composition; and a copier/printer exterior part, and in particular relates to, for example, a method for producing a thermoplastic resin composition having high fluidity without decreasing flame resistance, impact resistance and heat resistance.

2. Description of the Related Art

Nowadays, thermoplastic resins, such as a polycarbonate resin and a polyester resin, and resin compositions thereof are widely used as molding materials for containers, packaging films, household electrical devices, OA devices, AV devices, electric/electronic parts, automobile parts and so forth in terms of their outstanding formability, mechanical physical properties, heat resistance, weather resistance, external appearance properties, hygiene, economic efficiency and so forth. Resin-molded products used therefor need to be flame retardant.

In recent years, there has been increased interest in material recycling technology for molded products made of such thermoplastic resins and resin compositions thereof because "Act on the Promotion of Sorted Garbage Collection and Recycling of Containers and Packaging (Containers and Packaging Recycling Law)", "Act on Promotion of Procurement of Eco-Friendly Goods and Services by the State and Other Entities (Law on Promoting Green Purchasing)" and so forth were enforced in succession.

In particular, establishment of material recycling technology for PET (polyethylene terephthalate) bottles made of polyethylene terephthalate resin(s), the consumed quantity of which has been rapidly increasing, is an urgent necessity.

Also, with spread of optical recording medium products (optical disks) made of polycarbonate (PC) resin(s), such as CD, CD-R, DVD and MD, there have been examined a method for recycling bits and pieces generated when these products are formed and a method for recycling polycarbonate resin(s) obtained from waste optical disks after their reflecting layers, recording layers and so forth are removed.

When crystalline polyester resin(s) represented by PET resin of, for example, used PET bottles collected from the market or resin(s) obtained by pulverizing molded products made of PC resin, such as optical disks, is molded again by, in particular, injection molding, the resin needs to have high fluidity in molding as a resin property so as to be used for various molded products.

These days, large products in particular have been examined to meet a demand for being thin and flame retardant, and as the large products become thin, they need to be heat resistant to bear thermal deformation.

Further, when a resin composition contains a polyester resin and a polycarbonate resin for components of household electrical devices, OA devices (copiers and printers) and so forth, the resin composition needs to have high impact strength.

Polycarbonate resin(s) is outstanding in flame resistance, impact resistance, heat resistance and so forth, but low in fluidity and accordingly poor in formability. Therefore, polycarbonate resin(s) cannot be used for various molded products.

Then, various attempts have been made to increase fluidity of polycarbonate. For example, there has been proposed a method for polymer-alloying of a polycarbonate resin and an ABS resin or the like. (Refer to, for example, Japanese Patent Application Publication No. H11-293102.) However, such conventional polymer-alloying of a polycarbonate resin and an ABS resin or the like greatly decreases heat resistance temperature and cannot achieve high impact strength (impact resistance) and high flame resistance although it increases fluidity.

BRIEF SUMMARY OF THE INVENTION

The present invention has been made in view of the above problem/circumstances, namely, in a thermoplastic resin or a resin composition thereof, fluidity is traded off against flame resistance, impact resistance and heat resistance. Hence, objects of the present invention include providing: a method for producing a thermoplastic resin composition having high fluidity without decreasing flame resistance, impact resistance and heat resistance; a thermoplastic resin composition produced by the method; and a copier/printer exterior part manufactured with the thermoplastic resin composition.

That is, at least one of the objects is achieved by the following.

In order to achieve at least one of the objects, according to an aspect of the present invention, there is provided a method for producing a thermoplastic resin composition, the method including: melt-blending 50 to 80 parts by mass of a crystalline polyester resin and 20 to 50 parts by mass of an amorphous polyester resin with an extruder, thereby producing a first polyester resin compound; melt-blending 90 to 99 parts by mass of the crystalline polyester resin and 1 to 10 parts by mass of a styrene-acrylonitrile-glycidyl methacrylate terpolymer with the extruder used for producing the first polyester resin compound or a different extruder, thereby producing a second polyester resin compound; and compounding 1 to 10 parts by mass of the first polyester resin compound, 1 to 10 parts by mass of the second polyester resin compound, 10 to 90 parts by mass of a polycarbonate resin, 1 to 40 parts by mass of a flame retardant, 0.1 to 1 parts by mass of an antidrip agent, 0.1 to 1 parts by mass of an antioxidant, 0.1 to 2 parts by mass of a lubricant and 1 to 20 parts by mass of a toughening agent.

BRIEF DESCRIPTION OF THE SEVERAL VIEWS OF THE DRAWINGS

The present invention is fully understood from the detailed description given hereinafter and the accompanying drawings, which are given by way of illustration only, and thus are not intended to limit the present invention, wherein.

DETAILED DESCRIPTION OF THE INVENTION

A method for producing a thermoplastic resin composition of the present invention includes: melt-blending 50 to 80 parts by mass of a crystalline polyester resin and 20 to 50 parts by mass of an amorphous polyester resin with an extruder, thereby producing a first polyester resin compound; melt-blending 90 to 99 parts by mass of the crystalline polyester resin and 1 to 10 parts by mass of a styrene-acrylonitrile-glycidyl methacrylate terpolymer with the extruder used for producing the first polyester resin compound or a different extruder, thereby producing a second polyester resin compound; and compounding 1 to 10 parts by mass of the first polyester resin compound, 1 to 10 parts by mass of the second polyester resin compound, 10 to 90 parts by mass of a polycarbonate resin, 1 to 40 parts by mass of a flame retardant, 0.1 to 1 parts by mass of an antidrip agent, 0.1 to 1 parts by mass of an antioxidant, 0.1 to 2 parts by mass of a lubricant and 1 to 20 parts by mass of a toughening agent. This feature is a technical feature common or relevant to claims of the present invention.

Hereinafter, the present invention, its constituents and embodiment(s) for carrying out the present invention are detailed. In this application, "-(to)" between values is used to mean that the values before and after the sign are inclusive as the lower limit and the upper limit.

Examples of a copier or printer in the present invention include: a scanner to scan/read document images; a copier to copy/print document images scanned/read with a scanner; a printer or fax machine to print image data input from outside; and a multifunction machine provided with these functions, called MFP (Multi-Function Peripheral).

Figure 1:
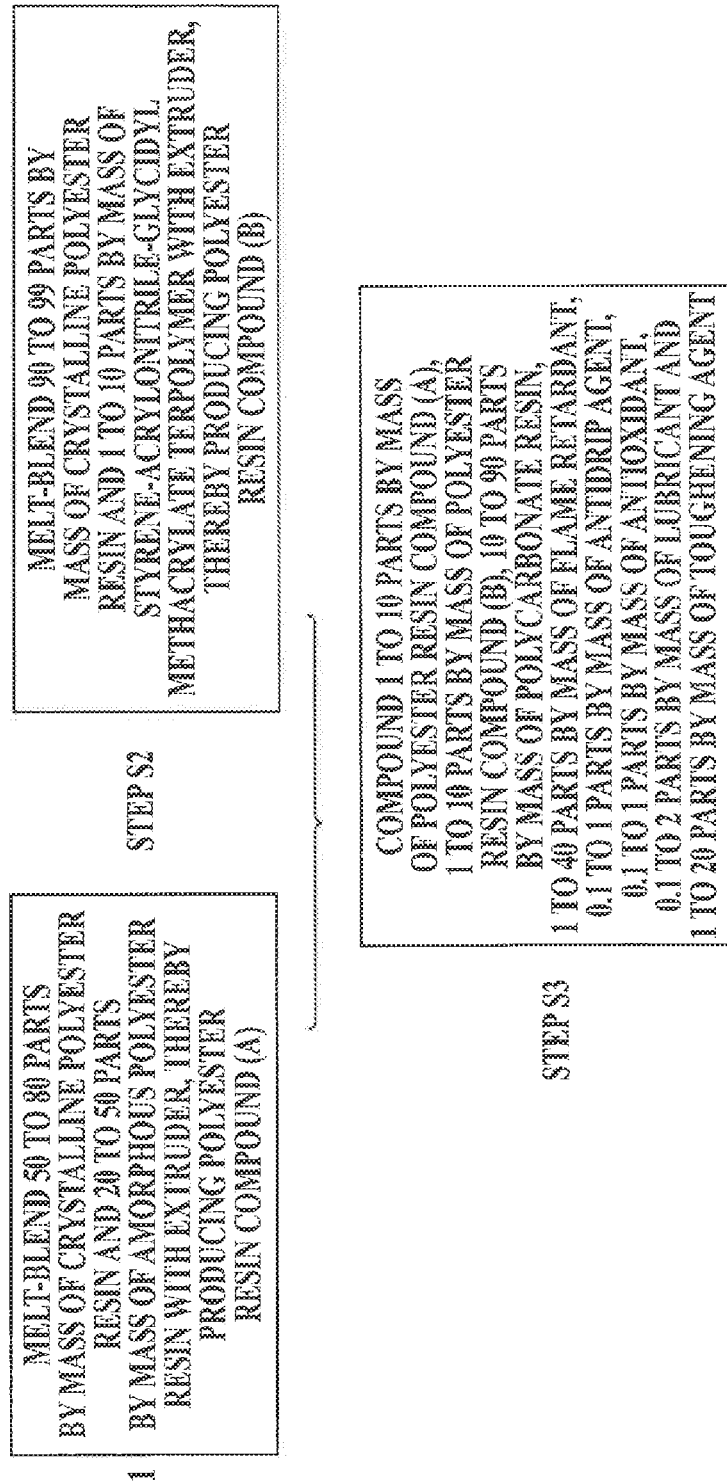
FIG. 1 schematically shows steps of a method for producing a thermoplastic resin composition of the present invention.

Hereinafter, an embodiment of the method for producing a thermoplastic resin composition of the present invention is described with reference to FIG. 1.

The method for producing a thermoplastic resin composition of the present invention includes: Step S1 of melt-blending 50 to 80 parts by mass of a crystalline polyester resin and 20 to 50 parts by mass of an amorphous polyester resin with an extruder, thereby producing a polyester resin compound (A) (first polyester resin compound); Step S2 of melt-blending 90 to 99 parts by mass of the crystalline polyester resin and 1 to 10 parts by mass of a styrene-acrylonitrile-glycidyl methacrylate terpolymer with an extruder (the same as that used at Step S1 or a different extruder), thereby producing a polyester resin compound (B) (second polyester resin compound); and Step S3 of compounding 1 to 10 parts by mass of the polyester resin compound (A), 1 to 10 parts by mass of the polyester resin compound (B), 10 to 90 parts by mass of a polycarbonate resin, 1 to 40 parts by mass of a flame retardant, 0.1 to 1 parts by mass of an antidrip agent, 0.1 to 1 parts by mass of an antioxidant, 0.1 to 2 parts by mass of a lubricant and 1 to 20 parts by mass of a toughening agent. The steps are described hereinafter.

[Step S1]

Step S1 is a step of melt-blending 50 to 80 parts by mass of a crystalline polyester resin and 20 to 50 parts by mass of an amorphous polyester resin with an extruder, thereby producing a polyester resin compound (A).

For the melt-blending, an extruder is used. Preferably, a multiaxial extruder is used, and far preferably, a biaxial extruder is used, because they can provide a high shear property and accelerate transesterification.

Melt-blending a crystalline polyester resin and an amorphous polyester resin cuts molecular chains of the crystalline polyester resin and the amorphous polyester resin and causes transesterification, which exchanges the molecular chains. This can make crystallinity of the crystalline polyester resin low. This low crystallinity of the crystalline polyester resin increases impact resistance and fluidity.

Mechanism of the increase in impact resistance is considered as follows: when crystallinity is high and molecular chains in a crystal are closely arranged, the resin is fragile and impact resistance is low, whereas when crystallinity is low and molecular chains in a crystal easily deform, impact resistance increases (high). Mechanism of the increase in fluidity is considered as follows: when crystallinity is low, increase in viscosity during a cooling step is gradual, and this gradual increase in viscosity in pouring the resin into a mold for molding (during the cooling step) allows the resin to spread into every corner of the mold, thereby making fluidity outstanding.

Preferably, heat discharge (ΔHA) in a DSC melting curve of the polyester resin compound (A) produced at Step S1 to heat discharge (ΔHB) in a DSC melting curve of the crystalline polyester resin is 70% or less (ΔHA/ΔHB≤0.7). The "ΔHA/ΔHB" is an indicator of degree of transesterification. The "ΔHA/ΔHB≤0.7" further increases fluidity. The "ΔHA/ΔHB" is far preferably 0.5 or less. The lower limit of the "ΔHA/ΔHB" is not particularly limited, but usually 0 or more.

As described above, the polyester resin compound (A) is produced by melt-blending 50 to 80 parts by mass of a crystalline polyester resin and 20 to 50 parts by mass of an amorphous polyester resin. When the amorphous polyester resin is more than 50 parts by mass, flame resistance of the thermoplastic resin composition is low, whereas when the amorphous polyester resin is less than 20 parts by mass, crystallinity of the crystalline polyester resin cannot be kept low.

(Crystalline Polyester Resin and Amorphous Polyester Resin)

The crystalline polyester resin and the amorphous polyester resin used for producing the polyester resin compound (A) are not particularly limited, but preferably aromatic polyester having a structure composed of aromatic dicarboxylic acid or its ester derivative component bonded with a diol component such as aliphatic diol or alicyclic diol by transesterification. As the polyester resin, usable is, for example, one produced by polycondensation of (i) aromatic dicarboxylic acid or its ester derivative component and (ii) aliphatic diol or alicyclic diol with a well-known method.

The crystalline polyester resin means, among the above polyester resins, a resin(s) not showing stepwise endothermic change but having a clear endothermic peak in differential scanning calorimetry (DSC). The clear endothermic peak means, to be specific, a peak having a full width at half maximum of the endothermic peak of 15° C. or less measured at a temperature rising rate of 10° C./min in differential scanning calorimetry (DSC) described in Examples below as a measurement method of the endothermic peak temperature of the crystalline polyester resin.

The crystalline polyester resin is not particularly limited as long as it is as defined above. For example, if a resin having a structure composed of the main chain of a crystalline polyester resin copolymerized with another component(s) shows a clear endothermic peak as described above, this resin comes under the crystalline polyester resin in the present invention.

Examples of the crystalline polyester resin include polyethylene terephthalate, polypropylene terephthalate, polybutylene terephthalate, polyethylene naphthalate, polypropylene naphthalate, and polybutylene naphthalate. Preferably, the crystalline polyester resin is at least one of polyethylene terephthalate and polybutylene terephthalate because they are widely used and can be easily recycled with the method of the present invention into resins having high fluidity and high impact resistance.

As the crystalline polyester resin, one type thereof may be used alone, or two or more types thereof may be used in combination.

The amorphous polyester resin is a polyester resin(s) other than the above crystalline polyester resins, namely, has no melting point but a relatively high glass transition temperature (Tg) in general. More specifically, the amorphous polyester resin has a glass transition temperature (Tg) of preferably 40° C. to 90° C., in particular 45° C. to 85° C. The glass transition temperature (Tg) is measured with a method described in Examples as a measurement method of the glass transition temperature (Tg) of the amorphous polyester resin.

Preferably, the amorphous polyester resin is a copolymer composed of at least terephthalic acid, ethylene glycol and 1,4-cyclohexanedimethanol (CHDM) as monomer components. Examples thereof include PETG resin (copolyester), PCTG resin (polycyclohexylenedimethylene terephthalate, produced by partly replacing ethylene glycol of PET with CHDM), and PCTA resin (copolymer composed of terephthalic acid, isophthalic acid, ethylene glycol and CHDM, produced by partly replacing the acid component of PCTG resin with isophthalic acid).

In the present invention, the PETG resin is a resin having a replacement ratio of the diol component (ethylene glycol) of polyethylene terephthalate (PET) with 1,4-cyclohexanedimethanol (CHDM) of 0.0001 mol % or more and less than 50 mol %, and the PCTG resin (polycyclohexylenedimethylene terephthalate) is a resin having a replacement ratio thereof of 50 mol % or more and 100 mol % or less.

As the PETG resin, preferably usable are ones produced and sold by Eastman Chemical Company and SK Chemicals. Examples of the PETG resin include Eastar GN071 (trade name) and Eastar 6763 (trade name) produced by Eastman Chemical Company.

Examples of the PCTG resin include Eastar DN001 (trade name) produced by Eastman Chemical Company.

The PCTA resin is a thermoplastic saturated copolyester produced by polycondensation of 1,4-cyclohexanedimethanol, terephthalic acid and isophthalic acid. Examples of the PCTA resin include KODAR THERM X6761 (trade name) and Eastar AN004 (trade name) produced by Eastman Chemical Company.

As the amorphous polyester resin, one type thereof may be used alone, or two or more types thereof may be used in combination.

In the embodiment, preferably, the crystalline polyester resin is at least one of polyethylene terephthalate and polybutylene terephthalate, and the amorphous polyester resin is at least one of PETG resin, PCTG resin and PCTA resin. These resins are preferable because they resemble each other in structure and have SP values similar to each other, and therefore are high in compatibility and easily cause transesterification. It is considered that use of polyethylene terephthalate and/or polybutylene terephthalate as the crystalline polyester resin and PETG resin and/or PCTG resin and/or PCTA resin as the amorphous polyester resin introduces the CHDM group in the amorphous polyester resin into the crystalline polyester resin and causes transesterification.

[Step S2]

Step S2 is a step of melt-blending 90 to 99 parts by mass of a crystalline polyester resin and 1 to 10 parts by mass of a styrene-acrylonitrile-glycidyl methacrylate terpolymer with an extruder, thereby producing a polyester resin compound (B).

For the melt-blending, an extruder is used. Preferably, a multiaxial extruder is used, and far preferably, a biaxial extruder is used, because they can provide a high shear property and accelerate transesterification.

Melt-blending a crystalline polyester resin and a styrene-acrylonitrile-glycidyl methacrylate terpolymer (SAN-GMA) reacts the terminal group of the crystalline polyester resin with GMA of the SAN-GMA. This elongates chain(s) of the crystalline polyester resin, and a thickening effect is exhibited. Further, the terminal of the crystalline polyester resin is end-blocked, and an effect of preventing hydrolysis reaction of the crystalline polyester resin is also exhibited. Thickening the crystalline polyester resin and preventing hydrolysis reaction thereof increase impact resistance.

The crystalline polyester resin used at Step S2 is the same as the crystalline polyester resin used at Step S1.

Preferably, in the styrene-acrylonitrile-glycidyl methacrylate terpolymer, content of glycidyl methacrylate is within a range from 1 to 5 mass %, and content of acrylonitrile is within a range from 20 to 33 mass %. Far preferably, in the styrene-acrylonitrile-glycidyl methacrylate terpolymer, content of glycidyl methacrylate is within a range from 1 to 5 mass %, and content of acrylonitrile is within a range from 27 to 30 mass %.

[Step S3]

Step S3 is a step of compounding 1 to 10 parts by mass of the polyester resin compound (A), 1 to 10 parts by mass of the polyester resin compound (B), 10 to 90 parts by mass of a polycarbonate resin, 1 to 40 parts by mass of a flame retardant, 0.1 to 1 parts by mass of an antidrip agent, 0.1 to 1 parts by mass of an antioxidant, 0.1 to 2 parts by mass of a lubricant and 1 to 20 parts by mass of a toughening agent.

In general, heat resistance and fluidity have an antinomic relationship. However, in the present invention, the polyester resin compound (A) and the polyester resin compound (B) are used in combination. This increases fluidity while maintaining heat resistance. The polyester resin compound (B) contains the thickened crystalline polyester resin and thereby has high heat resistance.

Although it was expected that this thickening effect would have decreased fluidity (when compared at the same temperature, a thickened crystalline polyester resin is more difficult to melt than a not-thickened one), fluidity increased.

Detailed mechanism thereof is unknown, but considered as follows: the thickening effect makes viscosity difference between the crystalline polyester resin and PC (polycarbonate) small and thereby increases dispersibility of the crystalline polyester resin (island phase) in PC (sea phase), and fine dispersion of the thickened crystalline polyester resin (island phase), which usually hinders fluidity, increases the surface area of the crystalline polyester resin (island phase) and thereby makes the crystalline polyester resin easy to melt, and thus thickening the crystalline polyester resin does not exhibit the fluidity hindering effect, but on the contrary, makes the crystalline polyester resin easy to melt and accordingly increases fluidity. Therefore, it is considered that the thickened crystalline polyester resin achieves both heat resistance and fluidity.

(Polycarbonate Resin)

The polycarbonate resin is an aromatic homo/co-polycarbonate resin produced by reaction of an aromatic dihydric phenol compound with phosgene or carbonic diester. A method for producing such a polycarbonate resin is not particularly limited, and a well-known method can be used.

Examples thereof include: a method (interfacial polymerization) of directly reacting an aromatic dihydric phenol compound with phosgene or the like; and a method (solution method) of transesterification of an aromatic dihydric phenol compound with carbonic diester such as diphenyl carbonate in a melted state.

Preferably, the polycarbonate resin has a weight average molecular weight of 20,000 to 70,000. When the weight average molecular weight of the polycarbonate resin is 20,000 or more, impact resistance further increases, whereas when the weight average molecular weight of the polycarbonate resin is 70,000 or less, fluidity becomes high. Far preferably, the polycarbonate resin has a weight average molecular weight of 30,000 to 55,000.

The weight average molecular weight is measured with a measurement method described in Examples below. The method for producing a thermoplastic resin composition of the present invention decreases crystallinity of a crystalline polyester resin. Hence, even when a polycarbonate resin having a relatively low molecular weight (e.g. a weight average molecular weight of about 20,000 to 45,000), which usually decreases impact resistance when used together with a crystalline polyester resin, is used, impact resistance is ensured.

Further, the method for producing a thermoplastic resin composition of the present invention decreases crystallinity of a crystalline polyester resin. Hence, even when a polycarbonate resin having a relatively high molecular weight (e.g. a weight average molecular weight of about 40,000 to 70,000), which usually decreases fluidity when used together with a crystalline polyester resin, is used, high fluidity is ensured.

As the polycarbonate resin, resin pieces obtained by pulverizing waste polycarbonate resin products may be used. In particular, as the polycarbonate resin having a molecular weight of the above range, pulverized articles of waste optical disks or the like can be suitably used. The resin pieces are not particularly limited and can be used in the present invention as long as they are articles having an appropriate size of 10 mm or less obtained by pulverizing (i) bits and pieces generated when optical disks, such as CD, CD-R, DVD or MD, or optical lenses are formed or (ii) waste optical disks with their reflecting layers, recording layers and so forth removed. The polycarbonate resin pieces of waste polycarbonate resin products can also be obtained by, after pulverizing and cleaning the products, blending the resulting substance(s) at a temperature of 180° C. or more and 260° C. or less once and then cooling and pulverizing it.

Virgin (unused) polycarbonate resins are commercially available in form of pellets. Any of these may be used as resin pieces by pressing it at a glass transition temperature or more, or by melting it with an extruder or the like and compressing the melted strand in cool water with rollers, and cutting it with a normal pelletizer.

(Flame Retardant)

The flame retardant may be an organic flame retardant or an inorganic flame retardant. Examples of the organic flame retardant include a bromo compound and a phosphorus compound. Examples of the inorganic flame retardant include an antimony compound and a metal hydroxide. Preferably, at least a part of the flame retardant is a phosphorus compound because a phosphorus compound can provide high flame resistance for the thermoplastic resin composition and also has no environmental toxicity. The phosphorus compound is typically a phosphate compound. Examples of the phosphate compound include triphenyl phosphate, tris(nonylphenyl) phosphate, tris(2,4-di-t-butyl- phenyl) phosphate, distearyl pentaerythritol diphosphate, bis (2,6-di-t-butyl-4-methylphenyl) pentaerythritol diphosphate, bis (2,4-di-t-butylphenyl) pentaerythritol diphosphate, tributyl phosphate, bisphenol A bis(diphenyl phosphate), and aromatic condensed phosphate. Among these, aromatic condensed phosphate is particularly preferable.

As the flame retardant, one type thereof may be used alone, or two or more types thereof may be used in combination.

(Antidrip Agent)

The antidrip agent is added in order to prevent resin materials from dripping during combustion and increase flame resistance. Examples of the antidrip agent include a fluorine-based antidrip agent, silicon rubber, and layered silicate.

As the antidrip agent, one type thereof may be used alone, or two or more types thereof may be used in combination.

(Antioxidant)

Examples of the antioxidant include hindered phenol, phosphite, and a mixed substance thereof.

(Lubricant)

The lubricant is one or more types selected from a group consisting of fatty acid salt, fatty acid amide, silane polymer, solid paraffin, liquid paraffin, calcium stearate, zinc stearate, octadecanamide, silicone powder, methylene bis(octadecanamide), and N,N'-ethylene bis(octadecanamide).

(Toughening Agent)

The toughening agent increases flexibility, formability, impact resistance and so forth of the thermoplastic resin composition. The toughening agent is, for example, a resin having rubber elasticity. Preferably, the toughening agent is a thermoplastic elastomer containing: a soft segment composed of a polymer of monomers including butadiene; and a hard segment composed of a polymer of monomers having an aromatic group such as styrene. Examples of the thermoplastic elastomer include a methyl methacrylate-butadiene-styrene copolymer (MBS), an acrylonitrile-butadiene-styrene copolymer (ABS), styrene-butadiene-styrene copolymer (SBS), and a butylacrylate-methylmethacrylate copolymer. Preferably, the toughening agent is one or more selected from a group consisting of MBS and ABS in terms of compatibility and flame resistance of the thermoplastic resin composition and dispersibility of the thermoplastic elastomer in the thermoplastic resin composition.

As the toughening agent, one type thereof may be used alone, or two or more types thereof may be used in combination.

EXAMPLES

Hereinafter, the present invention is detailed with Examples. However, the present invention is not limited thereto. Note that "parts" or "%" used in Examples stands for "parts by mass" or "mass % (percent by mass)" unless otherwise specified.

[Measurement Methods]

(Weight Average Molecular Weight (MW))

Each sample was weighted to be 4 to 7 µg, added to THF, and then subjected to ultrasound for 30 minutes. The melted portion was used for measurement with a GPC device. For the weight average molecular weight (MW) (in terms of polystyrene), HLC-8120GPC and SC-8020 (from Tosoh Co.) were used as GPC device(s), TSKgel SuperHM-H (6.0 mm I.D.×15 cm×2, from Tosoh Co.) was used as column(s), and THF (tetrahydrofuran) for chromatography (from Wako Pure Chemical Industries) was used as an elute.

The experiment conditions were as follows: flow rate; 0.6 ml/min, sample injection volume; 10 μl, and measurement temperature; 40° C. As a detector, an IR detector was used. A calibration curve was produced from 10 samples of TSK standard polystyrene: A-500, F-1, F-10, F-80, F-380, A-2500, F-4, F-40, F-128 and D-700 (from Tosoh Co.). The data collection interval in sample analysis was 300 ms.

(Endothermic Peak Temperature of Crystalline Polyester Resin and Glass Transition Temperature (Tg) of Amorphous Polyester Resin)

The endothermic peak temperature of the crystalline polyester resin and the glass transition temperature (Tg) of the amorphous polyester resin were obtained with a differential scanning calorimeter (DSC-60A, from Shimadzu Corporation) in conformity to ASTM D3418. For temperature correction of the detection part of this device (DSC-60A), melting points of indium and zinc were used, and for calorific value correction, heat of fusion of indium was used. Using an aluminum pan with an empty pan set for comparison, each sample was heated at a temperature rising rate of 10° C./min, held at 200° C. for five minutes, cooled from 200° C. to 0° C. at a temperature falling rate of 10° C./min using liquid nitrogen, held at 0° C. for five minutes, and heated from 0° C. to 200° C. at a temperature rising rate of 10° C./min again. Analysis was made from the endothermic curve of the second heating. As to the amorphous polyester resin, the onset temperature was taken as Tg.

(Heat Discharge (ΔHA) in DSC Melting Curve of Polyester Resin Compound (A))

Heat discharge (ΔHA) in a DSC melting curve of the polyester resin compound (A) was obtained with a differential scanning calorimeter (DSC-60A, from Shimadzu Corporation) in conformity to ASTM D3418. For temperature correction of the detection part of this device (DSC-60A), melting points of indium and zinc were used, and for calorific value correction, heat of fusion of indium was used. Using an aluminum pan with an empty pan set for comparison, each sample was heated from 30° C. to 270° C. at a temperature rising rate of 10° C./min, held at 270° C. for five minutes, and cooled from 270° C. to 30° C. at a temperature falling rate of 10° C./min using liquid nitrogen. Analysis was made from the endothermic curve of the cooling. The area of the heat radiation peak was taken as the heat discharge.

Heat discharge (ΔHB) in a DSC melting curve of the crystalline polyester resin was obtained in the same way.

[Used Materials]
- polyethylene terephthalate: intrinsic viscosity [η]=0.780 dl/g, trade name; Dianite MA521H-D25, from Mitsubishi Rayon Co., Ltd.
- polybutylene terephthalate: intrinsic viscosity [η]=1.41 dl/g, trade name; TORAYCON 1100M, from Toray Industries, Inc.
- PCTG resin: glass transition temperature; 87° C., trade name; Eastar DN011, from Eastman Chemical Company
- PCTA resin: trade name; Eastar AN004, from Eastman Chemical Company
- PETG resin: glass transition temperature; 80° C., trade name; Eastar GN071, from Eastman Chemical Company
- polycarbonate resin: weight average molecular weight; 20,000, trade name; NOVAREX 7020R, from Mitsubishi Engineering-Plastics Corporation
- polycarbonate resin: weight average molecular weight; 70,000, trade name; NOVAREX 7027U, from Mitsubishi Engineering-Plastics Corporation Example 1

(1) Step S1

80 parts by mass of a polyethylene terephthalate resin (intrinsic viscosity [η]=0.780 dl/g, trade name; Dianite MA521H-D25, from Mitsubishi Rayon Co., Ltd.) and 20 parts by mass of a PCTG resin (glass transition temperature; 87° C., trade name; Eastar DN011, from Eastman Chemical Company) were dry-blended with a V-type mixer, and the resulting substance was dried with a vacuum dryer at 80° C. for four hours under reduced pressure.

The dried substance was poured from a raw material supply port of a biaxial extruder, and melt-blended under the conditions of a cylinder temperature of 270° C. and a discharge amount of 30 kg/h. The melt-blended substance discharged from the biaxial extruder was immersed in water of 30° C. for rapid cooling and pulverized with a pelletizer to be pellets. Thus, a polyester resin compound (A) was produced. The produced polyester resin compound (A) was dried with a vacuum dryer at 80° C. for four hours under reduced pressure.

(2) Step S2

95 parts by mass of a polyethylene terephthalate resin (intrinsic viscosity [η]=0.780 dl/g, trade name; Dianite MA521H-D25, from Mitsubishi Rayon Co., Ltd.) and 5 parts by mass of a styrene-acrylonitrile-glycidyl methacrylate terpolymer (SAN-GMA, content of GMA; 2%, content of acrylonitrile; 28%, from Shanghai Kumho Sunny Plastics Co., Ltd.) were dry-blended with a V-type mixer, and the resulting substance was dried with a vacuum dryer at 80° C. for four hours under reduced pressure.

The dried substance was poured from a raw material supply port of a biaxial extruder, and melt-blended under the conditions of a cylinder temperature of 260° C. and a discharge amount of 30 kg/h. The melt-blended substance discharged from the biaxial extruder was immersed in water of 30° C. for rapid cooling and pulverized with a pelletizer to be pellets. Thus, a polyester resin compound (B) was produced. The produced polyester resin compound (B) was dried with a vacuum dryer at 80° C. for four hours under reduced pressure.

(3) Step S3

7.4 parts by mass of the polyester resin compound (A) produced at Step S1, 4.9 parts by mass of the polyester resin compound (B) produced at Step S2, 61.4 parts by mass of a polycarbonate resin (weight average molecular weight; 50,000, trade name; TARFLON A-1900, from Idemitsu Kosan Co., Ltd.), 15.8 parts by mass of a flame retardant (condensed phosphate compound, trade name; BDP, from Great Lakes Chemical Corporation), 0.4 parts by mass of an antidrip agent (AS COAT, content of PTFE; 50%, commercially available), 0.2 parts by mass of an antioxidant (mixed substance of IRGAFOS 168: IRGANOX 1076=1:1 (mass ratio)), 0.2 parts by mass of a lubricant (DOW CORNING MB-50) and 9.7 parts by mass of a toughening agent (mixed substance of MBS (trade name; EM500, from LG Chem Ltd.): ABS (content of butadiene; 54%, content of styrene; 34%, content of acrylonitrile; 12%, from Kumho Petrochemical Co., Ltd.)=1:1 (mass ratio)) were dry-blended with a V-type mixer.

The resulting substance was poured from a raw material supply port of a biaxial extruder, and melt-blended under the conditions of a cylinder temperature of 260° C., a discharge amount of 30 kg/h and a blending pressure of 1.0 MPa. The melt-blended substance discharged from the biaxial extruder was immersed in water of 30° C. for rapid cooling and pulverized with a pelletizer to be pellets. Thus, a thermoplastic resin composition was produced.

Example 2

A thermoplastic resin composition was produced in the same way as Example 1 except that, at Step S1, a PCTA resin was used instead of the PCTG resin.

Example 3

A thermoplastic resin composition was produced in the same way as Example 1 except that, at Step S1, a PETG resin was used instead of the PCTG resin.

Example 4

A thermoplastic resin composition was produced in the same way as Example 3 except that, at Step S1, the polyethylene terephthalate resin was 70 parts by mass and the PETG resin was 30 parts by mass.

Example 5

A thermoplastic resin composition was produced in the same way as Example 3 except that, at Step S1, the polyethylene terephthalate resin was 50 parts by mass and the PETG resin was 50 parts by mass.

Example 6

A thermoplastic resin composition was produced in the same way as Example 3 except that, at Step S2, the polyethylene terephthalate resin was 98 parts by mass and the styrene-acrylonitrile-glycidyl methacrylate terpolymer (SAN-GMA) was 2 parts by mass.

Example 7

A thermoplastic resin composition was produced in the same way as Example 3 except that, at Step S2, the polyethylene terephthalate resin was 92 parts by mass and the styrene-acrylonitrile-glycidyl methacrylate terpolymer (SAN-GMA) was 8 parts by mass.

Example 8

A thermoplastic resin composition was produced in the same way as Example 3 except that, at Step S3, a polycarbonate resin (weight average molecular weight; 20,000, trade name; NOVAREX 7020R, from Mitsubishi Engineering-Plastics Corporation) was used instead of the polycarbonate resin (weight average molecular weight; 50,000, trade name; TARFLON A-1900, from Idemitsu Kosan Co., Ltd.).

Example 9

A thermoplastic resin composition was produced in the same way as Example 3 except that, at Step S3, a polycarbonate resin (weight average molecular weight; 70,000, trade name; NOVAREX 7027U, from Mitsubishi Engineering-Plastics Corporation) was used instead of the polycarbonate resin (weight average molecular weight; 50,000, trade name; TARFLON A-1900, from Idemitsu Kosan Co., Ltd.).

Example 10

A thermoplastic resin composition was produced in the same way as Example 3 except that, at Step S3, the polyester resin compound (A) produced at Step S1 was 6.2 parts by mass and the polyester resin compound (B) produced at Step S2 was 6.1 parts by mass.

Example 11

A thermoplastic resin composition was produced in the same way as Example 3 except that, at Step S3, the polyester resin compound (A) produced at Step S1 was 4.9 parts by mass and the polyester resin compound (B) produced at Step S2 was 7.4 parts by mass.

Example 12

A thermoplastic resin composition was produced in the same way as Example 1 except that, at Steps S1 and S2, a polybutylene terephthalate resin (intrinsic viscosity [η]=1.41 dl/g, trade name; TORAYCON 1100M, from Toray Industries, Inc.) was used instead of the polyethylene terephthalate resin (intrinsic viscosity [η]=0.780 dl/g, trade name; Dianite MA521H-D25, from Mitsubishi Rayon Co., Ltd.).

Example 13

A thermoplastic resin composition was produced in the same way as Example 2 except that, at Steps S1 and S2, a polybutylene terephthalate resin (intrinsic viscosity [η]=1.41 dl/g, trade name; TORAYCON 1100M, from Toray Industries, Inc.) was used instead of the polyethylene terephthalate resin (intrinsic viscosity [η]=0.780 dl/g, trade name; Dianite MA521H-D25, from Mitsubishi Rayon Co., Ltd.).

Example 14

A thermoplastic resin composition was produced in the same way as Example 3 except that, at Steps S1 and S2, a polybutylene terephthalate resin (intrinsic viscosity [η]=1.41 dl/g, trade name; TORAYCON 1100M, from Toray Industries, Inc.) was used instead of the polyethylene terephthalate resin (intrinsic viscosity [η]=0.780 dl/g, trade name; Dianite MA521H-D25, from Mitsubishi Rayon Co., Ltd.).

Comparative Examples 1 and 2 (Comparative Examples about PET/PETG

Thermoplastic resin compositions were produced in Comparative Examples 1 and 2 in the same way as Example 3 except that the mass ratio PET/PETG at Step S1 was changed to 4/6 and 9/1, respectively.

Comparative Examples 3 and 4 (Comparative Examples about PET/SAN-GMA

Thermoplastic resin compositions were produced in Comparative Examples 3 and 4 in the same way as Example 3 except that the mass ratio PET/SAN-GMA at Step S2 was changed to 10/0 and 8/2, respectively.

Comparative Examples 5 and 6 (Comparative Examples about Addition State of Polyester Resin Compound (A)

Thermoplastic resin compositions were produced in Comparative Examples 5 and 6 in the same way as Example 3 except that, at Step S1, instead of the polyester resin compound (A), a mixture (ΔHA/ΔHB=1.0) produced by dry-blending the resins and drying the resulting substance with a vacuum dryer at 80° C. for four hours under reduced pressure without melt-blending and no polyester resin compound (A) or the like were used, respectively.

Comparative Examples 7 and 8 (Comparative Examples about Addition State of Polyester Resin Compound (B)

Thermoplastic resin compositions were produced in Comparative Examples 7 and 8 in the same way as Example 3 except that, at Step S2, instead of the polyester resin compound (B), a mixture produced by dry-blending the resin and the terpolymer and drying the resulting substance with a vacuum dryer at 80° C. for four hours under reduced pressure without melt-blending and no polyester resin compound (B) or the like were used, respectively.

Comparative Example 9 (Comparative Example about Addition States of Polyester Resin Compound (A) and Polyester Resin Compound (B)

A thermoplastic resin composition was produced in Comparative Example 9 in the same way as Example 3 except that, at Step S1, instead of the polyester resin compound (A), a mixture (ΔHA/ΔHB=1.0) produced by dry-blending the resins and drying the resulting substance with a vacuum dryer at 80° C. for four hours under reduced pressure without melt-blending was used and, at Step S2, instead of the polyester resin compound (B), a mixture produced by dry-blending the resin and the terpolymer and drying the resulting substance with a vacuum dryer at 80° C. for four hours under reduced pressure without melt-blending was used.

The following evaluations were made with respect to the thermoplastic resin compositions produced in Examples and Comparative Examples.
[Evaluation Methods]
(1) Izod Impact Strength (Impact Resistance)

After the thermoplastic resin compositions were dried at 80° C. for four hours, they were molded into 80 mm×10 mm×4 mm strip-type specimens with an injection molding machine J55ELII (from The Japan Steel Works, Ltd.) under the conditions of a cylinder temperature of 250° C. and a mold temperature of 50° C. Then, an Izod impact text was conducted in conformity to JIS-K7110-1998. The evaluation was made with the following criteria.

⊚ (double circle, outstanding): 42 kJ/m² or more
○ (circle, good): 32 kJ/m² or more and less than 42 kJ/m²
Δ (triangle, no problem in practical use): 7 kJ/m² or more and less than 32 kJ/m²
x (cross, problem in practical use): less than 7 kJ/m²
(2) Fluidity After the thermoplastic resin compositions were dried at 80° C. for four hours, with an injection molding machine ROBOSHOT S-2000i 50BP (from FANAC Cooperation), flow length in an Archimedes spiral flow specimen (flow channel thickness: 2 mm, flow channel width: 10 mm) was evaluated with the following our company criteria. The conditions were a cylinder temperature of 250° C., a mold temperature of 50° C., an injection rate of 60 mm/s and an injection pressure of 860 MPa. The longer the flow length is, the better the fluidity is.

⊚ (double circle, outstanding): 340 mm or more
○ (circle, good): 320 mm or more and less than 340 mm
Δ (triangle, no problem in practical use): 300 mm or more and less than 320 mm
x (cross, problem in practical use): less than 300 mm
(3) Flame Resistance After the thermoplastic resin compositions were dried at 80° C. for four hours, they were molded into 100 mm×100 mm×1.6 mm strip-type specimens with an injection molding machine J55ELII (from The Japan Steel Works, Ltd.) under the conditions of a cylinder temperature of 250° C. and a mold temperature of 50° C.

The specimens produced by the above method as specimens for UL tests were conditioned in a thermostatic chamber having a temperature of 23° C. and a humidity of 50% for 48 hours. Then, a test was conducted in conformity to UL94 (Standard for Tests for Flammability of Plastic Materials for Parts in Devices and Appliances) developed by Underwriters Laboratories (UL) of the USA. The test, UL94V, is an evaluation method of flame resistance. According to UL94V, flame resistance is evaluated from (i) the afterflame time after a flame of a burner is brought in contact with a vertically-held specimen of a predetermined size for ten seconds and (ii) a dripping property during the texting. Each specimen was evaluated with the following criteria.

⊚ (double circle, outstanding): 5VA, 5VB
○ (circle, good): V0
Δ (triangle, no problem in practical use): V1, V2, HB
x (cross, problem in practical use): below the standard)
(4) Heat Resistance After the thermoplastic resin compositions were dried at 80° C. for four hours, they were molded into 80 mm×10 mm×4 mm strip-type specimens with an injection molding machine J55ELII (from The Japan Steel Works, Ltd.) under the conditions of a cylinder temperature of 250° C. and a mold temperature of 50° C. Then, deflection temperature under load (flatwise, A) was measured in conformity to JIS-K 7191-1. The evaluation was made with the following criteria.

Figure 2:
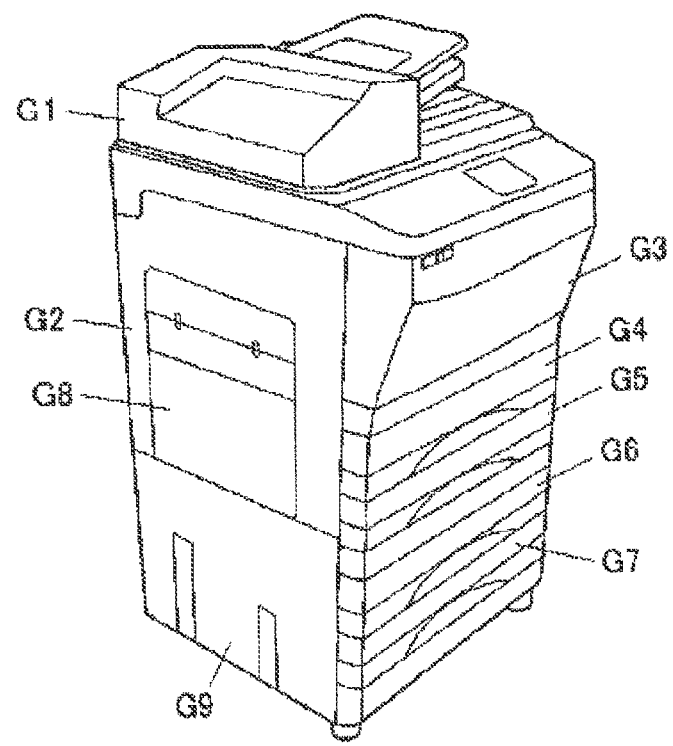
FIG. 2 shows external appearance of a copier using exterior parts manufactured with the thermoplastic resin composition.
Figure 3:
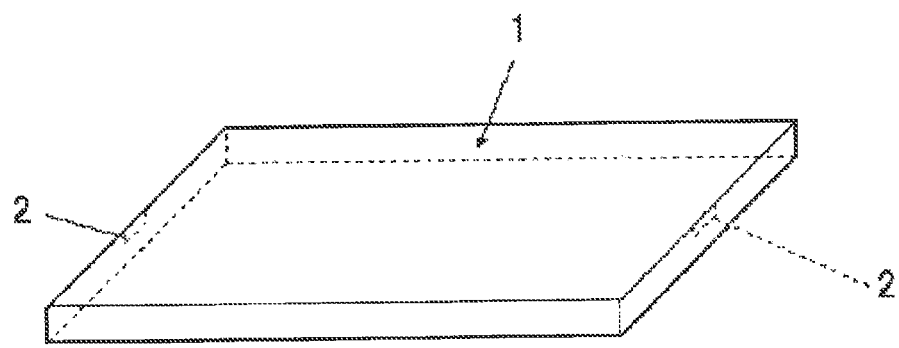
FIG. 3 is a perspective view of a trial product (molded product) of an exterior part used in Examples of the present invention.

⊚ (double circle, outstanding): 74° C. or more
○ (circle, good): 72° C. or more and less than 74° C.
Δ (triangle, no problem in practical use): 70° C. or more and less than 72° C.
x (cross, problem in practical use): less than 70° C.
(5) Manufacturing of Exterior Part After the produced pellets were dried at 80° C. for four hours with a hot air circulation dryer, they were molded into trial products, each of which is a molded product 1 provided with pin side gates 2 shown in FIG. 3, of a large copier exterior part, which is, for example, any of copier exterior parts G1 to G9 shown in FIG. 2, with an injection molding machine J1300E-05 (from The Japan Steel Works, Ltd.) under the conditions of a cylinder temperature of 250° C. and a mold temperature of 50° C. Samples were taken from the center parts thereof. Various properties were measured using these molded trial products/samples.

Here, external appearance of each molded trial product of a copier exterior part was evaluated by visual observation of the external appearance. The evaluation was made with the following criteria. The evaluation results are shown in TABLE 3.

⊚ (double circle, outstanding): no problem in external appearance

○ (circle, no problem as a product): few burns and/or burrs are seen

× (cross, problem as a product): burns and/or burrs are seen

The production conditions of Examples and Comparative Examples are shown in TABLE 1, and the evaluation results are shown in TABLE 2 and TABLE 3.

TABLE 1

| THERMOPLASTIC RESIN COMPOSITION | *1 | STEP S1 *2 | *3 | Δ HA/ Δ HB | STEP S2 *4 | *5 | *6 | STEP S3 COMPOUNDING AMOUNT [parts by mass] ANTI-DRIP AGENT | ANTI-OXIDANT | *7 | POLYESTER RESIN COMPOUND (A) | POLYESTER RESIN COMPOUND (B) | PC | *8 |
|---|---|---|---|---|---|---|---|---|---|---|---|---|---|---|
| EXAMPLE 1 | PET | PCTG | 8/2 | 0.6 | 9.5/0.5 | 9.7 | 15.8 | 0.4 | 0.2 | 0.2 | 7.4 | 4.9 | 61.4 | 50000 |
| EXAMPLE 2 | PET | PCTA | 8/2 | 0.6 | 9.5/0.5 | 9.7 | 15.8 | 0.4 | 0.2 | 0.2 | 7.4 | 4.9 | 61.4 | 50000 |
| EXAMPLE 3 | PET | PETG | 8/2 | 0.6 | 9.5/0.5 | 9.7 | 15.8 | 0.4 | 0.2 | 0.2 | 7.4 | 4.9 | 61.4 | 50000 |
| EXAMPLE 4 | PET | PETG | 7/3 | 0.5 | 9.5/0.5 | 9.7 | 15.8 | 0.4 | 0.2 | 0.2 | 7.4 | 4.9 | 61.4 | 50000 |
| EXAMPLE 5 | PET | PETG | 5/5 | 0.2 | 9.5/0.5 | 9.7 | 15.8 | 0.4 | 0.2 | 0.2 | 7.4 | 4.9 | 61.4 | 50000 |
| EXAMPLE 6 | PET | PETG | 8/2 | 0.6 | 9.8/0.2 | 9.7 | 15.8 | 0.4 | 0.2 | 0.2 | 7.4 | 4.9 | 61.4 | 50000 |
| EXAMPLE 7 | PET | PETG | 8/2 | 0.6 | 9.2/0.8 | 9.7 | 15.8 | 0.4 | 0.2 | 0.2 | 7.4 | 4.9 | 61.4 | 50000 |
| EXAMPLE 8 | PET | PETG | 8/2 | 0.6 | 9.5/0.5 | 9.7 | 15.8 | 0.4 | 0.2 | 0.2 | 7.4 | 4.9 | 61.4 | 20000 |
| EXAMPLE 9 | PET | PETG | 8/2 | 0.6 | 9.5/0.5 | 9.7 | 15.8 | 0.4 | 0.2 | 0.2 | 7.4 | 4.9 | 61.4 | 70000 |
| EXAMPLE 10 | PET | PETG | 8/2 | 0.6 | 9.5/0.5 | 9.7 | 15.8 | 0.4 | 0.2 | 0.2 | 6.2 | 6.1 | 61.4 | 50000 |
| EXAMPLE 11 | PET | PETG | 8/2 | 0.6 | 9.5/0.5 | 9.7 | 15.8 | 0.4 | 0.2 | 0.2 | 4.9 | 7.4 | 61.4 | 50000 |
| EXAMPLE 12 | PBT | PCTG | 8/2 | 0.6 | 9.5/0.5 | 9.7 | 15.8 | 0.4 | 0.2 | 0.2 | 7.4 | 4.9 | 61.4 | 50000 |
| EXAMPLE 13 | PBT | PCTA | 8/2 | 0.6 | 9.5/0.5 | 9.7 | 15.8 | 0.4 | 0.2 | 0.2 | 7.4 | 4.9 | 61.4 | 50000 |
| EXAMPLE 14 | PBT | PETG | 8/2 | 0.6 | 9.5/0.5 | 9.7 | 15.8 | 0.4 | 0.2 | 0.2 | 7.4 | 4.9 | 61.4 | 50000 |
| COMPARATIVE EXAMPLE 1 | PET | PETG | 4/6 | 0.2 | 9.5/0.5 | 9.7 | 15.8 | 0.4 | 0.2 | 0.2 | 7.4 | 4.9 | 61.4 | 50000 |
| COMPARATIVE EXAMPLE 2 | PET | PETG | 9/1 | 0.9 | 9.5/0.5 | 9.7 | 15.8 | 0.4 | 0.2 | 0.2 | 7.4 | 4.9 | 61.4 | 50000 |
| COMPARATIVE EXAMPLE 3 | PET | PETG | 8/2 | 0.6 | 10/0 | 9.7 | 15.8 | 0.4 | 0.2 | 0.2 | 7.4 | 4.9 | 61.4 | 50000 |
| COMPARATIVE EXAMPLE 4 | PET | PETG | 8/2 | 0.6 | 8/2 | 9.7 | 15.8 | 0.4 | 0.2 | 0.2 | 7.4 | 4.9 | 61.4 | 50000 |
| COMPARATIVE EXAMPLE 5 | PET | PETG | 8/2 | 1.0 | 9.5/0.5 | 9.7 | 15.8 | 0.4 | 0.2 | 0.2 | MIXTURE 7.4 | 4.9 | 61.4 | 50000 |
| COMPARATIVE EXAMPLE 6 | PET | — | — | — | 9.5/0.5 | 9.7 | 15.8 | 0.4 | 0.2 | 0.2 | 0 | 12.3 | 61.4 | 50000 |
| COMPARATIVE EXAMPLE 7 | PET | PETG | 8/2 | 0.6 | 9.5/0.5 | 9.7 | 15.8 | 0.4 | 0.2 | 0.2 | 7.4 | MIXTURE 4.9 | 61.4 | 50000 |
| COMPARATIVE EXAMPLE 8 | PET | PETG | 8/2 | 0.6 | — | 9.7 | 15.8 | 0.4 | 0.2 | 0.2 | 12.3 | 0 | 61.4 | 50000 |
| COMPARATIVE EXAMPLE 9 | PET | PETG | 8/2 | 1.0 | 9.5/0.5 | 9.7 | 15.8 | 0.4 | 0.2 | 0.2 | MIXTURE 7.4 | MIXTURE 4.9 | 61.4 | 50000 |

*1: CRYSTALLINE POLYESTER RESIN
*2: AMORPHOUS POLYESTER RESIN
*3: CRYSTALLINE POLYESTER RESIN/AMORPHOUS POLYESTER RESIN [MASS RATIO]
*4: CRYSTALLINE POLYESTER RESIN/SAN-GMA RESIN [MASS RATIO]
*5: TOUGHENING AGENT
*6: FLAME RETARDANT
*7: LUBRICANT
*8: PC MOLECULAR WEIGHT

TABLE 2

| THERMOPLASTIC RESIN COMPOSITION | IMPACT RESISTANCE | FLUIDITY | FLAME RESISTANCE | HEAT RESISTANCE |
|---|---|---|---|---|
| EXAMPLE 1 | ○ | ○ | ○ | ○ |
| EXAMPLE 2 | ○ | ○ | ○ | ○ |
| EXAMPLE 3 | ○ | ○ | ○ | ○ |
| EXAMPLE 4 | ○ | ⊚ | ○ | ○ |
| EXAMPLE 5 | ○ | ○ | ○ | ⊚ |
| EXAMPLE 6 | ○ | ○ | ○ | ○ |
| EXAMPLE 7 | ⊚ | Δ | Δ | ○ |
| EXAMPLE 8 | Δ | ⊚ | ○ | Δ |
| EXAMPLE 9 | ⊚ | Δ | ○ | ⊚ |
| EXAMPLE 10 | ○ | ○ | ○ | ○ |
| EXAMPLE 11 | ○ | Δ | ○ | ⊚ |
| EXAMPLE 12 | ○ | ○ | ○ | ○ |

TABLE 2-continued

| THERMOPLASTIC RESIN COMPOSITION | IMPACT RESISTANCE | FLUIDITY | FLAME RESISTANCE | HEAT RESISTANCE |
|---|---|---|---|---|
| EXAMPLE 13 | ○ | ○ | ○ | ○ |
| EXAMPLE 14 | ○ | ○ | ○ | ○ |
| COMPARATIVE EXAMPLE 1 | ⊚ | ○ | X | ○ |
| COMPARATIVE EXAMPLE 2 | ○ | X | ○ | ○ |
| COMPARATIVE EXAMPLE 3 | X | ○ | ○ | ○ |
| COMPARATIVE EXAMPLE 4 | ⊚ | X | X | ○ |
| COMPARATIVE EXAMPLE 5 | X | Δ | ○ | ○ |
| COMPARATIVE EXAMPLE 6 | ○ | X | ○ | ⊚ |
| COMPARATIVE EXAMPLE 7 | ○ | ○ | ○ | X |
| COMPARATIVE EXAMPLE 8 | ○ | ○ | ○ | X |
| COMPARATIVE EXAMPLE 9 | X | X | ○ | ○ |

TABLE 3

| EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|
| ○ | ○ | ○ | ⊚ | ○ | ○ | ○ | ⊚ |

| EXAMPLE 9 | EXAMPLE 10 | EXAMPLE 11 | EXAMPLE 12 | EXAMPLE 13 | EXAMPLE 14 | COMPARATIVE EXAMPLE 1 | COMPARATIVE EXAMPLE 2 |
|---|---|---|---|---|---|---|---|
| ○ | ○ | ○ | ○ | ○ | ○ | ○ | X |

| COMPARATIVE EXAMPLE 3 | COMPARATIVE EXAMPLE 4 | COMPARATIVE EXAMPLE 5 | COMPARATIVE EXAMPLE 6 | COMPARATIVE EXAMPLE 7 | COMPARATIVE EXAMPLE 8 | COMPARATIVE EXAMPLE 9 |
|---|---|---|---|---|---|---|
| ○ | X | ○ | X | ○ | ○ | X |

The thermoplastic resin compositions of Examples 1 to 14 of the present invention have Δ or higher evaluation results in all of the impact resistance, fluidity, flame resistance and heat resistance. Thus, it is indicated that they are fine in all of these physical properties.

On the other hand, as it is known from the evaluation results of Comparative Examples 1 and 2 compared with those of Example 3, when PETG is too much, flame resistance is low, and when PET is too much, fluidity is low.

Further, as it is known from the evaluation results of Comparative Examples 3 and 4 compared with those of Example 3, when there is no SAN-GMA, impact resistance is low, and when SAN-GMA is too much, fluidity and flame resistance are low.

Further, as it is known from the evaluation results of Comparative Examples 5 and 6 compared with those of Example 3, when no melt-blending is performed at Step S1, impact resistance and fluidity are low, and when there is no polyester resin compound (A) or the like, fluidity is low.

Further, as it is known from the evaluation results of Comparative Examples 7 and 8 compared with those of Example 3, when no melt-blending is performed at Step S2, heat resistance is low, and when there is no polyester resin compound (B) or the like, heat resistance is low.

Further, as it is known from the evaluation results of Comparative Example 9 compared with those of Example 3, when no melt-blending is performed at Steps S1 and S2, impact resistance and fluidity are low.

Further, as it is known from the evaluation results of Examples and Comparative Examples, the molded trial products of a copier exterior part, made of the thermoplastic resin compositions of Examples, are fine in external appearance.

In the above, a preferred embodiment and Examples of the present invention are described. However, these are examples to explain the present invention and thus are not intended to limit the scope of the present invention. The present invention can be carried out in various forms, different from the above embodiment too, within the scope not departing from its spirit.

This application claims a priority under the Paris Convention of Chinese Patent Application No. 201510142210.9 filed on Mar. 27, 2015, the entire disclosure of which, including the description, claims, drawings, and abstract, is incorporated herein by reference in its entirety.

What is claimed is:

1. A method for producing a thermoplastic resin composition, the method comprising:
   melt-blending 50 to 80 parts by mass of a crystalline polyester resin and 20 to 50 parts by mass of an amorphous polyester resin with an extruder, thereby producing a first polyester resin compound;
   melt-blending 90 to 99 parts by mass of the crystalline polyester resin and 1 to 10 parts by mass of a styrene-acrylonitrile-glycidyl methacrylate terpolymer with the extruder used for producing the first polyester resin compound or a different extruder, thereby producing a second polyester resin compound; and
   compounding 1 to 10 parts by mass of the first polyester resin compound, 1 to 10 parts by mass of the second polyester resin compound, 10 to 90 parts by mass of a polycarbonate resin, 1 to 40 parts by mass of a flame retardant, 0.1 to 1 parts by mass of an antidrip agent, 0.1 to 1 parts by mass of an antioxidant, 0.1 to 2 parts by mass of a lubricant and 1 to 20 parts by mass of a toughening agent.

2. The method according to claim 1, wherein a heat discharge in a DSC melting curve of the first polyester resin compound to a heat discharge in a DSC melting curve of the crystalline polyester resin is 70% or less.

3. The method according to claim 1, wherein the crystalline polyester resin is at least one of polyethylene terephthalate and polybutylene terephthalate.

4. The method according to claim 1, wherein the amorphous polyester resin is at least one of PETG resin, PCTG resin and PCTA resin,
- the PETG resin is a copolymer resin having terephthalic acid, ethylene glycol, and 1,4-cyclohexanedimethanol as monomer components, wherein an amount of the 1,4-cyclohexanedimethanol is 0.0001 mol % or more and less than 50 mol % based on a total amount of the ethylene glycol and the 1,4-cyclohexanedimethanol,
- the PTCG resin is a copolymer resin having terephthalic acid, ethylene glycol, and 1,4-cyclohexanedimethanol as monomer components, wherein an amount of the 1,4-cyclohexanedimethanol is 50 mol % or more and 100 mol % or less based on a total amount of the ethylene glycol and the 1,4-cyclohexanedimethanol, and
- the PCTA resin is a copolymer resin having terephthalic acid, isophthalic acid, and 1,4-cyclohexanedimethanol.

5. The method according to claim 1, wherein the polycarbonate resin has a weight average molecular weight of 20,000 to 70,000.

6. The method according to claim 1, wherein in the styrene-acrylonitrile-glycidyl methacrylate terpolymer, a content of glycidyl methacrylate is 1 to 5 mass %, and a content of acrylonitrile is 20 to 33 mass %.

7. A thermoplastic resin composition produced by the method according to claim 1.

8. A copier/printer exterior part comprising the thermoplastic resin composition according to claim 7.

9. The method according to claim 1, wherein the compounding step forms a sea island structure having a sea phase comprising the polycarbonate and an island phase comprising the crystalline polyester resin, and the island phase is dispersed in the sea phase.

* * * * *